United States Patent [19]

Freiburger

[11] 4,029,189

[45] June 14, 1977

[54] WINCH CLUTCH PRESSURE REDUCING VALVE AND LUBRICATION SYSTEM

[75] Inventor: Thomas William Freiburger, Dubuque, Iowa

[73] Assignee: Deere & Company, Moline, Ill.

[22] Filed: May 5, 1975

[21] Appl. No.: 574,554

[52] U.S. Cl. .................. 192/113 B; 192/109 F; 192/12 C

[51] Int. Cl.² ...................................... F16D 13/72

[58] Field of Search ........ 192/113 B, 70, 12, 109 F

[56] References Cited

UNITED STATES PATENTS

| | | | |
|---|---|---|---|
| 2,869,701 | 1/1959 | Yokel | 192/113 B |
| 3,064,779 | 11/1962 | Christenson | 192/113 B |
| 3,128,861 | 4/1964 | Trondsen | 192/113 B |
| 3,351,169 | 11/1967 | McIndoe | 192/113 B |
| 3,391,767 | 7/1968 | Stow | 192/113 B |
| 3,823,801 | 7/1974 | Arnold | 192/109 F |
| 3,872,957 | 3/1975 | Maurer et al. | 192/113 B |

*Primary Examiner*—Benjamin W. Wyche

[57] ABSTRACT

A control for a hydraulically operable clutch of a winch applied to a grapple-skidder includes a pressure-reducing valve which is selectively operable to permit the clutch to slip in those instances when a cable connected between a drum of the winch and a load or grapple structure is being wound in and the load or grapple structure comes into engagement with an immovable object such as a tree or framework at the rear of the grapple-skidder. The clutch is of a disc type adapted for operating in a lubricating fluid and the pressure-reducing valve is operative to effect an increase in the flow of lubricating fluid to the clutch when the valve is operated to permit the clutch to slip.

4 Claims, 3 Drawing Figures

WINCH CLUTCH PRESSURE REDUCING VALVE AND LUBRICATION SYSTEM

BACKGROUND OF THE INVENTION

The present invention relates to a hydraulic control system for controlling the operation of a winch and more specifically relates to means for controlling the main clutch of a winch particularly suited for use with forestry vehicles, such as skidders or grapple-skidders.

A winch provided on a skidder or a grapple-skidder typically has a cable connected to a drum thereof and has a primary function of winding in or paying out the cable so as to retrieve or drop a load coupled to the cable. In the case of a grapple-skidder winch, the cable thereof is often connected to the grapple and wound in to snub the grapple against framework at the rear of the grapple-skidder so as to prevent the grapple from flopping about during transport.

The operator of the winch may, through unawareness of the situation, neglect or carelessness, continue to operate the winch to apply full driving torque to wind in a load or to snub a grapple to framework at the back of the vehicle after the load has engaged an immovable object such as a tree, a boulder or framework of the vehicle or after the grapple has become completely snubbed. Heretofore, such operation of known winches has sometimes resulted in damage to the winch drive train and/or to the grapple being snubbed.

SUMMARY OF THE INVENTION

According to the present invention there is provided a winch control for reducing the possibility that, during wind in operation of a winch, damage to the winch drive and/or a grapple connected to the winch cable will result due to a load or a grapple connected to the cable becoming engaged with an immovable object.

A broad object of the invention is to provide, in combination with a hydraulically operable winch clutch, a hydraulic control system including a selectively operable pressure reducing valve for effecting a condition permitting the winch clutch to slip.

Another object of the invention is to provide a disc-type winch clutch adapted to operate in lubricating fluid and to provide a valve, as described in the preceding paragraph, which also effects an increase of the flow of lubricating fluid to the clutch when it effects the condition permitting the winch clutch to slip.

These and other objects will become apparent from a reading of the following description in conjunction with the appended drawings.

DESCRIPTION OF THE PREFERRED EMBODIMENT

Figure 1:
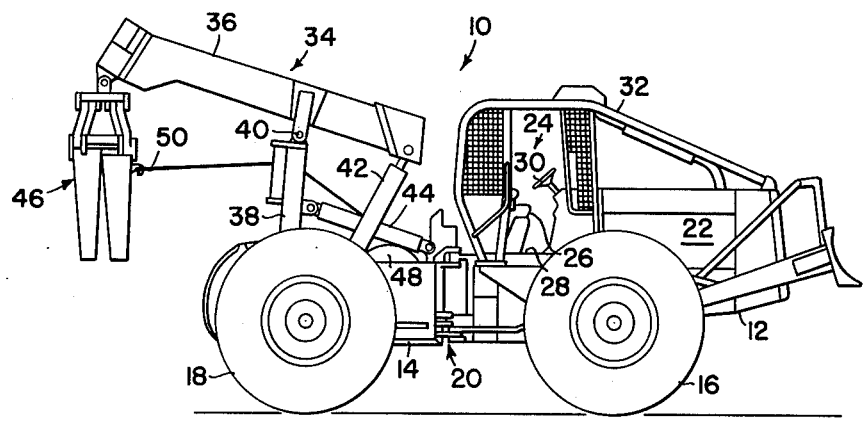
FIG. 1 is a somewhat schematic side-elevational view of a vehicle of the type with which the present invention is particularly adapted for use.

Referring now to FIG. 1, therein is shown a forestry vehicle here depicted as a grapple-skidder indicated in its entirety by the reference numeral 10. The grapple-skidder 10 includes front and rear frame sections 12 and 14, respectively, supported on front and rear sets of drive wheels 16 and 18 (only one of each set shown) and interconnected by a vertical pivot assembly 20.

Located on the front frame section 12 is a prime mover 22 which is forwardly of an operator's station 24. A forwardly facing seat 26 is located on a floor 28 of the station 24 just rearwardly of and in easy reach of a steering wheel 30. Other controls, not shown for the sake of simplicity, would normally be arranged about the seat 26 so as to be within easy reach of a seated operator. A protective canopy 32 extends over the station 24.

Mounted on the rear frame section 14 is a grapple structure 34 including a fore-and-aft extending grapple support boom 36 supported intermediate its ends by an upright support structure 38 to the top of which the boom 36 is pivotally connected for swinging about a transverse horizontal axis at 40. The lower end of the structure 38 is pivotally connected to the frame section 14 by conventional means (not shown) which establish a horizontal, transverse pivot axis about which the structure 38 is pivotable. A first pair of hydraulic actuators 42 (only one shown) are connected between the frame 14 and the front end of the support boom 36 for rocking the latter about the axis at 40 and a second pair of hydraulic actuators 44 (only one shown) are connected between the frame 14 and the structure 38 for pivoting the latter about the unshown connection at the lower end of the structure 38. Suspended from the rear end of the boom 36 is a grapple 46. A winch 48 is also mounted on the frame 14 and connected between the winch 48 and the grapple 46 is a cable 50.

Figure 2:
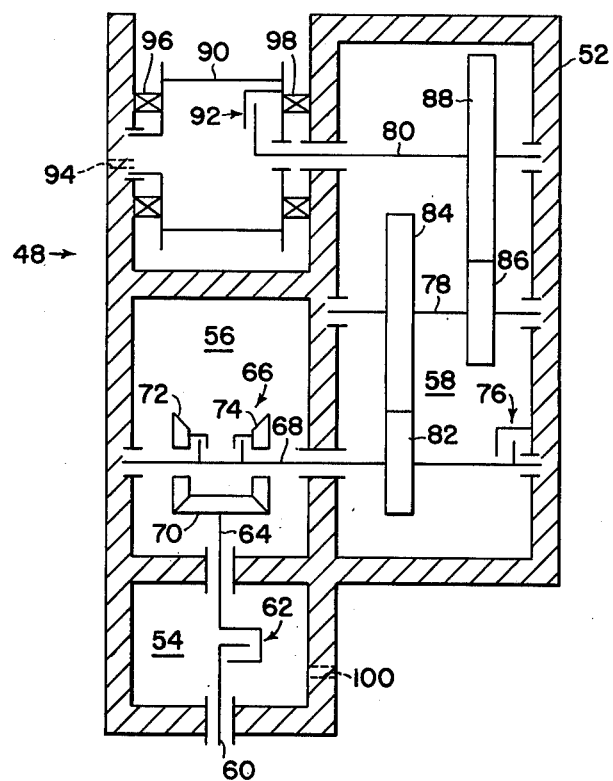
FIG. 2 is a schematic representation of a sectional view of a winch of the type with which the winch control of the present invention is particularly adapted for use.

As can best be seen in FIG. 2, the winch 48 includes a framework 52 defining a main clutch housing 54, an adjacent reverse clutch housing 56 and a reduction gearing housing 58. For a purpose to be set forth below, the various housings cooperate to define a fluid tight cavity for containing and conveying lubrication fluid.

The winch 48 includes a drive train mounted in the framework 52 within the various housings. Specifically, the winch drive train includes an input shaft 60 which is connected to the prime mover 22 by transmission means (not shown) and which projects into the main clutch housing 54 and serves as an input to a clutch 62 which is normally disengaged and preferably is of a conventional hydraulically engageable friction disc type adapted to operate in lubrication fluid. A shaft 64 serves as an output from the clutch 62 and projects into the reverse clutch housing 58. The shaft 64 serves as the input for a gear-type reverse clutch 66. Serving as an output from the clutch 66 is a shaft 68 which extends crosswise to the shaft 64 in the housing 56 and projects into the reduction gearing housing 58. The clutch 66 includes an input bevel gear 70 fixed to the shaft 64 in constant mesh with forward and reverse drive output bevel gears 72 and 74, respectively, shown meshed with the gears 70 at diametrically opposite left and right locations. The gears 72 and 74 are mounted so as to turn freely on the shaft 68; however, the clutch 66 is normally engaged so as to connect the gear 72 for rotation with the shaft 68 so as to effect a forward or wind in driving condition in the drive train. The clutch 66 is selectively operable, in a conventional manner, to release the gear 72 from and connect the gear 74 to the shaft 68 to effect a reverse or wind out driving condition in the drive train.

Located in the reduction gearing housing 58 at the right end of the shaft 68 is a normally engaged brake 76 which is preferably of a hydraulically disengageable type. Arranged in the housing 58 above the shaft 68 is a countershaft 78 and located above the countershaft 78 is an output shaft 80. Reduction gearing is provided between the shaft 68 and the shaft 80 and includes a small pinion 82 fixed on the shaft 68 and meshed with a gear 84 fixed on the shaft 78. Fixed on the shaft 78 adjacent the gear 84 is a small pinion 86 which is meshed with a gear 88 fixed on the output shaft 80.

The output shaft 80 projects leftwardly through the housing 58 and into the right end of a hollow open-ended cable drum 90. The cable drum 90 has its left end rotatably mounted in the framework 52 and its right end rotatably mounted on the shaft 80. The shaft 80 serves as an input to a normally engaged free-spool clutch 92 which preferably is of a hydraulically disengageable type. The cable drum 90 serves as the output from the clutch 92.

Located in the framework 52 adjacent the left end of the drum 90 is a lubrication fluid inlet 94 located so as to deliver lubrication fluid to the interior of the drum 90. Fluid so delivered will flow through the drum 90, into the housing 58, then into the housing 56 and finally into the housing 54 where it serves to lubricate the clutch 66, it being noted that the fluid serves as well to lubricate the various other components located in the housings 54, 56 and 58. For preventing leakage of lubrication fluid between the drum 90 and the framework 52, there are provided left and right seals 96 and 98. A lubrication fluid outlet 100 is located in the framework 52 so as to lead from the housing 54.

Figure 3:
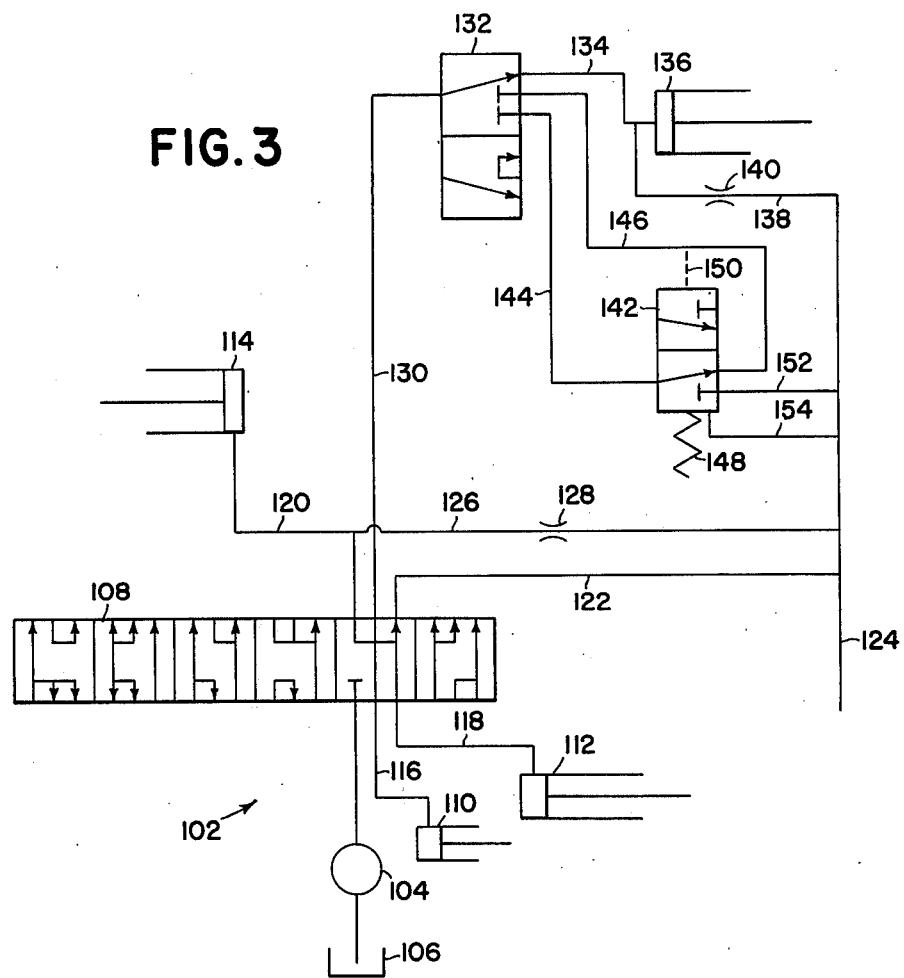
FIG. 3 is a schematic view of the hydraulic control system for controlling the winch shown in FIG. 2.

The various hydraulically controllable functions of the winch 48 are controlled through means of a hydraulic control system (FIG. 3) indicated in its entirety by the reference numeral 102. The system 102 includes a pump 104 having an inlet connected to a reservoir 106 and an outlet connected to a direction control valve 108. Actuators 110, 112 and 114 respectively of the reverse clutch 66, the free-spool clutch 92 and the brake 76 are connected to the control valve 108 respectively through means of lines 116, 118 and 120. Also connected to the valve 108 is a lubrication fluid feed line 122, which is connected to a main lubrication fluid delivery line 124 which is in turn connected to the inlet 94 in the framework 52. A branch line 126 connects the brake line 120 to the line 124 and contains a flow restrictor 128 for ensuring that adequate pressure will be available to fully disengage the brake 76 when the control valve 108 is shifted to one of its operative positions for connecting the pump 104 to the actuator 114.

Also connected to the control valve 108 is a main clutch line 130, which leads to a two-position, clutch pressure selector valve 132. The selector valve 132 is shown on its normal position of operation wherein the clutch line 130 is connected by means of a line 134 to an actuator 136 of the main clutch 62. A branch line 138 connects the line 134 to the line 124 and contains a restrictor 140 which acts to ensure that adequate pressure will be available to fully engage the main clutch 62 when the control valve 108 is shifted to one of its operative positions for connecting the pump 104 to the clutch line 130 and the selector valve 132 is in its normal position illustrated wherein the clutch line 130 is connected to the actuator 136.

As will be more fully explained below, lines 122 126, and 138 constitute primary lubrication fluid feed lines for conveying lubrication fluid to the delivery line 124.

The selector valve 132 is provided for controlling the operation of a pressure reducing valve 142 and cooperates therewith to form pressure reducing valve means. The valve 132 is connected to the valve 142 by a supply line 144 for conveying fluid to the valve 142 when the valve 132 is shifted upwardly from its illustrated position to an actuated position connecting the line 130 to the line 144. Also connected between the valves 132 and 142 is a return line 146 for conveying fluid back to the valve 132 when the valve 142 is in its illustrated, normal upwardly shifted position and the valve 132 is in its actuated position. The valve 132 then serves to connect the line 146 to the line 134. It is here noted that a modulating spring 148 acts on the bottom of the valve 142 to bias the latter toward its normal upwardly shifted position and a pilot pressure line 150 is connected between the line 146 and the top of the valve 142 so that the pressure in the line 150 acts on the valve 142 in opposition to the force exerted by the spring 148. The stiffness of the spring 148 is so chosen that when the selector valve 132 is actuated the pressure reducing valve 142 will shift downwardly to block the flow of fluid to the clutch actuator 136 when the pressure in the actuator 136 has reached a predetermined value below that required for complete engagement of the clutch 62 to thus permit the clutch 62 to slip when the drive train becomes overloaded. When the pressure reducing valve 142 shifts downwardly; it connect the line 144 to a line 152, which is connected to the lubrication fluid delivery line 124 and thus constitutes a supplementary lubrication fluid feed line. Also connected between the valve 142 and the line 124 is a bleed line 154 which collects leakage fluid from the valve 142.

It is here noted that lubrication fluid routed to the winch drive train is finally connected back to the reservoir 106 by a line (not shown) connected between the outlet 100 in the framework 52.

The operation of the clutch pressure reducing means is as follows. Assuming that winch 48 is employed on a grapple-skidder as shown in FIG. 1 with the cable 50 connected to the grapple 46 and that the direction control valve 108 is in the position illustrated, the pump 104 will be disconnected from the various winch functions thus establishing a neutral condition wherein the main clutch 62 is disengaged, the reverse clutch 66 is engaged to establish a forward drive condition, the brake 76 is engaged and the free spool clutch 92 is enagaged. thus, the prime mover 22 will be disconnected from the winch drive train and the brake 76 will be operative to prevent rotation of the drum 90 so as to maintain a constant length of the cable 50 "payed out" between the winch 48 and the grapple 46.

If the operator is going to drive the grapple-skidder 10 any great distance without doing any work, he may desire to snub the grappled 46 against the boom 36 or against framework at the rear end of the rear frame section 14. Since damage might occur to the winch drive train or to the grapple 46 during snubbing if the main clutch is fully engaged when the grapple 46 engages the boom 36 or framework of the frame section 14, the operator will shift the selector valve 132 from its upper normal position shown in FIG. 3, to its lower actuated position. Since no pressure will yet be present in the main clutch line 130, the pressure reducing valve 142 will remain in its normal upward position shown in FIG. 3. The operator will then shift the direction control valve 108 leftwardly from its illustrated position to a wind in position wherein the pump 104 is connected to the brake actuator 114 via the brake line 120 and to the main cutch actuator 136 via the lines 130, 144, 146 and 134. The main clutch 62 then starts to engage and the brake 76 becomes disengaged and the drum 90 begins to rotate to wind in the cable 50 to snub the grapple 46. As the pressure builds in the clutch actuator 136, it will act on the top of the pressure reducing valve 142 in opposition to force the spring 148 and at a predetermined value less than that required for effecting full engagement of the clutch 62. The valve 142 will shift downwardly to disconnect the line 144 from the line 146 and at the same time connect the line 144 to part of the lubrication fluid circuit defined by a supplemental fluid line 152. The pressure in the clutch actuator 136 will gradually fall due to fluid draining to the part of the lubrication circuit defined by the line 138 and the restrictor 140 and the spring 148 will return the valve to its upper position to again connect the line 144 to the line 146. It is here noted that leakage from the valve 142 is directed to a drain line 154 which is connected to the line 124.

All lubrication fluid which is routed to the delivery line 124 is delivered to the port 94 in the upper part of the winch framework 52. The lubrication fluid will flow through the drum 90 and into the reduction gear housing 58. From the housing 58, the lubrication fluid will flow into the housing 56 and then into the housing 54 where it will lubricate the main clutch 62 and then psss on to the reservoir 106 via the outlet 100. It will be appreciated that fluid supplied to the delivery line 124 will quickly find its way to the clutch 62 since a minimum level of fluid would normally exist in the drum 90 and housings 54, 56 and 58.

Thus, with the selector valve 132 in its lower actuated position it will be appreciated that the clutch 62 will slip at least when the winch drive train is under load and that extra lubrication fluid will be routed to the clutch 62 to lubricate the same and carry away the additional heat generated by the clutch due to the slipping thereof.

Obviously, the winch 48 may be selectively operated to wind in the cable 50 and a load attached thereto without the selector valve 132 being shifted from its position shown. In those instances the direction control valve 108 will be shifted leftwardly, as described above, to connect the pump 104 to the brake actuator 114 via the line 120 and to the clutch actuator 136 via the line 134. The pressure reducing valve 142 will thus be bypassed and the clutch 62 and brake 76 will then respectively become fully engaged and disengaged. Lubrication fluid will then be supplied only as regulated by the restrictors 128 and 140 respectively located in the lines 126 and 138.

Further operation of the winch 48 may be selected by actuation of the control valve 108 but a description thereof is omitted for the sake of brevity since they add nothing, not already described, relative to the operation of the clutch pressure reducing means.

I claim:

1. In a combination of a hydraulically operable clutch and hydraulic control system therefor wherein the clutch includes friction elements and a hydraulic actuator for effecting full engagement of the friction elements in response to receiving operating fluid as a predetermined minimum pressure and wherein the control system includes a source of fluid pressure connected to a direction control valve operative for selectively connecting or disconnecting the source of fluid pressure to or from a clutch line, and a lubrication fluid passage means connected in fluid communication with the friction elements of and including a primary lubrication feed line connected to the actuator of the clutch, the improvement comprising: a pressure reducing valve means connected to the clutch line and to the hydraulic actuator of the clutch; said clutch line being connected only between the direction control valve and the pressure reducing valve means; said lubrication fluid passage means including a supplemental lubrication fluid feed line means connected to the pressure reducing valve means; and the pressure reducing valve means being selectively operable, only when at least said minimum pressure exists in the clutch line, to establish a normal first operating condition for connecting fluid pressure in the clutch line to the actuator so as to establish full pressure engagement of the clutch while blocking fluid communication between the clutch line and the supplemental lubrication fluid feed line means, and to establish a second operating condition for connecting fluid pressure in the clutch line to the actuator so as to establish partial pressure engagement of the clutch and to connect the clutch line to the supplemental lubrication fluid feed line means.

2. The winch and control system therefore described in claim 1 wherein said pressure reducing valve means includes a manually operable selector valve and a pressure-responsive pressure reducing valve; said selector valve being connected to said clutch line and to said actuator; a supply line and a return line connected between the selector valve and the pressure reducing valve; said supplemental lubrication fluid feed line means being connected to the pressure reducing valve; biasing means acting on the pressure reducing valve for normally holding the latter in a first position wherein the supply and return lines are interconnected and the supply line is blocked from the supplemental lubrication fluid feed line means; a pilot pressure line interconnecting the return line with the pressure reducing valve so that the pressure of fluid in the return line acts in opposition to said biasing means so as to shift the pressure reducing valve to a second position wherein the supply line is connected to the supplemental lubrication fluid feed line means while being blocked from the return line and said selector valve being manually shiftable between a normal first position establishing said normal operating condition of said pressure reducing valve means by connecting the clutch line to the actuator by a path bypassing the pressure reducing valve, and a second position establishing said second operating condition by connecting the clutch line to the supply line while connecting the return line to the actuator.

3. In a combination of a winch and a control system therefor wherein the winch includes a cable drum connected to a drive train including a normally disengaged, hydraulically engageable main clutch adapted for operating in lubricating fluid and including a hydraulic actuator operable for effecting full clutch engagement in response to receiving operating fluid at a predetermined minimum pressure, a direction control valve connected to a pump and to a main clutch line and being operable for selectively connecting or disconnecting the pump to and from the clutch line, and a lubrication fluid passage means connected to the clutch and including a primary lubrication fluid feed line connected to the actuator, the improvement comprising: said lubrication fluid passage means including a supplemental lubrication fluid line means; selectively operable pressure reducing valve means connected to the clutch line, to the actuator and to the supplemental lubrication fluid line means and being operable only when at least said minimum pressure exists in said clutch line, between a first selected condition, for establishing fluid communication between the clutch line and the actuator without reducing the communicated fluid pressure below said minimum pressure, and a second selected condition for establishing fluid communication between the clutch line and the actuator and to the supplemental lubrication fluid line means such as to maintain the pressure communicated to the actuator at a pressure below said minimum pressure but sufficient for effecting partial clutch engagement while connecting the clutch line to the supplemental lubrication fluid line means.

4. The winch and control system therefor described in claim 3 wherein said pressure reducing valve means includes a manually operable selector valve and a pressure-responsive pressure reducing valve; said selector valve being connected to said clutch line and to said actuator; a supply line and a return line connected between the selector valve and the pressure reducing valve; said supplemental lubrication fluid feed line means being connected to the pressure reducing valve; biasing means acting on the pressure reducing valve for normally holding the latter in a first position wherein the supply and return lines are interconnected and the supply line is blocked from the supplemental lubrication fluid feed line means; a pilot pressure line interconnecting the return line with the pressure reducing valve so that the pressure of fluid in the return line acts in opposition to said biasing means so as to shift the pressure reducing valve to a second position wherein the supply line is connected to the supplemental lubrication fluid feed line means while being blocked from the return line of said selector valve being manually shiftable between a normal first position establishing said normal operating condition of said pressure reducing valve means by connecting the clutch line to the actuator by a path bypassing the pressure reducing valve, and a second position establishing said second operating condition by connecting the clutch line to the supply line while connecting the return line to the actuator.

* * * * *

UNITED STATES PATENT OFFICE
CERTIFICATE OF CORRECTION

Patent No. 4,029,189  Dated 14 June 1977

Inventor(s) Thomas William Freiburger

It is certified that error appears in the above-identified patent and that said Letters Patent are hereby corrected as shown below:

Column 5, line 68, delete "as" and insert --at--.

Column 8, line 16, delete "of" and insert --and--.

Signed and Sealed this

Sixth Day of December 1977

[SEAL]

Attest:

RUTH C. MASON  
*Attesting Officer*

LUTRELLE F. PARKER  
*Acting Commissioner of Patents and Trademarks*